(12) United States Patent
Inagaki et al.

(10) Patent No.: US 8,679,682 B2
(45) Date of Patent: Mar. 25, 2014

(54) NONAQUEOUS-ELECTROLYTE BATTERY AND BATTERY PACK

(75) Inventors: Hiroki Inagaki, Kawasaki (JP); Norio Takami, Yokohama (JP); Shinsuke Matsuno, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 553 days.

(21) Appl. No.: 12/199,160

(22) Filed: Aug. 27, 2008

(65) Prior Publication Data

US 2009/0061292 A1 Mar. 5, 2009

(30) Foreign Application Priority Data

Aug. 28, 2007 (JP) ................. 2007-221541

(51) Int. Cl.
- H01M 4/13 (2010.01)
- H01M 4/58 (2010.01)
- H01M 10/48 (2006.01)
- H01M 4/62 (2006.01)
- H01M 6/16 (2006.01)

(52) U.S. Cl.
USPC .............. 429/231.95; 429/90; 429/231.9; 429/232; 429/324

(58) Field of Classification Search
USPC ........ 429/218.1, 213, 231.95, 231.9, 324, 90, 429/232
See application file for complete search history.

(56) References Cited

U.S. PATENT DOCUMENTS

2006/0093917 A1* 5/2006 Howard et al. .......... 429/231.95
2008/0241689 A1 10/2008 Takami et al.

FOREIGN PATENT DOCUMENTS

| CN | 1728442 A | | 2/2006 | |
|---|---|---|---|---|
| JP | 07-235297 | * | 9/1995 | .............. H01M 4/02 |
| JP | 8-22841 | | 1/1996 | |

OTHER PUBLICATIONS

U.S. Appl. No. 12/366,914, filed Feb. 6, 2009, Inagaki, et al.
U.S. Appl. No. 12/212,257, filed Sep. 17, 2008, Takami, et al.
Chinese Office Action issued Dec. 11, 2009, in Patent Application No. 200810211152.0 (with English-language translation).

* cited by examiner

*Primary Examiner* — Patrick Ryan
*Assistant Examiner* — Julian Anthony
(74) *Attorney, Agent, or Firm* — Oblon, Spivak, McClelland, Maier & Neustadt, L.L.P.

(57) ABSTRACT

A nonaqueous-electrolyte battery includes a positive electrode, a negative electrode which is constituted of a negative-electrode current collector and a layer containing a negative active material and deposited on one or each side of the negative-electrode current collector and in which the layer contains at least one member selected from lithium carbonate, lithium sulfide, lithium phosphide, and lithium fluoride and further contains a lithium-titanium composite oxide, and a nonaqueous electrolyte.

16 Claims, 4 Drawing Sheets

NONAQUEOUS-ELECTROLYTE BATTERY AND BATTERY PACK

CROSS-REFERENCE TO RELATED APPLICATIONS

This application is based upon and claims the benefit of priority from the prior Japanese Patent Application No. 2007-221541, filed on Aug. 28, 2007, the entire contents of which are incorporated herein by reference.

BACKGROUND OF THE INVENTION

1. Field

The present invention relates to a nonaqueous-electrolyte battery and a battery pack.

2. Description of the Related Art

Nonaqueous-electrolyte batteries which are charged/discharged based on the movement of lithium ions between the negative electrode and positive electrode are being extensively investigated and developed as batteries having a high energy density.

These nonaqueous-electrolyte batteries are desired to have various properties according to applications. For example, the batteries used as the power sources of digital cameras are expected to be discharged at about 3 C, while the batteries mounted on vehicles such as, e.g., hybrid electric cars are expected to be discharged at about 10 C or higher. Because of this, nonaqueous-electrolyte batteries for use in such applications are especially desired to have high-current characteristics and an excellent charge/discharge cycle life in repetitions of charge/discharge at a high current.

At present, nonaqueous-electrolyte batteries employing a lithium-transition metal composite oxide as a positive active material and a carbonaceous substance as a negative active material have been commercialized. In the lithium-transition metal composite oxide, the transition metal generally is cobalt, manganese, nickel, or the like.

In recent years, a nonaqueous-electrolyte battery employing as a negative active material a lithium-titanium composite oxide having a higher lithium insertion/release potential than carbonaceous substances was proposed. Lithium-titanium composite oxides change little in volume with charge/discharge and hence have excellent cycle characteristics. Of these composite oxides, spinel lithium titanate is especially promising.

For example, JP-A 8-22841 discloses a battery employing a spinel lithium-manganese oxide in the positive electrode and a spinel lithium-titanium oxide in the negative electrode. This battery constitution enables the nonaqueous-electrolyte secondary battery to withstand severe charge/discharge.

As a result of investigations diligently made by the present inventors, it has been found that the batteries employing a lithium-titanium composite oxide as a negative active material suffer a large amount of self-discharge during storage.

BRIEF SUMMARY OF THE INVENTION

The invention may provide, according to a first aspect thereof, a nonaqueous-electrolyte battery which comprises
a positive electrode,
a negative electrode which comprises a negative-electrode current collector and a layer containing a negative active material and deposited on one or each side of the negative-electrode current collector and in which the layer contains at least one member selected from lithium carbonate, lithium sulfide, lithium phosphide, and lithium fluoride and further contains a lithium-titanium composite oxide, and
a nonaqueous electrolyte.

The invention may further provide a battery pack including a battery assembly composed of nonaqueous-electrolyte batteries which each are the battery described above and which have been electrically connected serially or in parallel.

According to the embodiments of the invention, a nonaqueous-electrolyte battery and a battery pack can be provided which are reduced in self-discharge while retaining intact charge/discharge cycle performance.

DETAILED DESCRIPTION OF THE INVENTION

Figure 1:
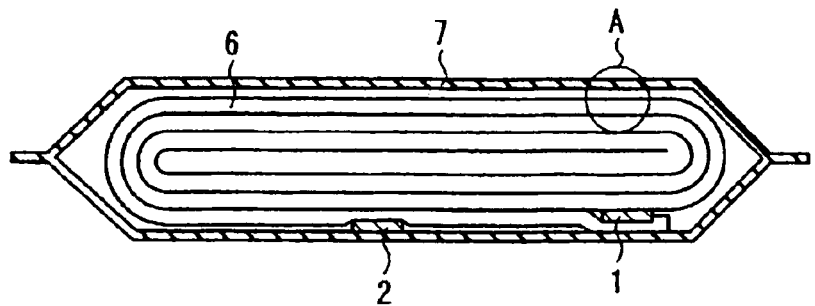
FIG. 1 is a diagrammatic sectional view of a flat type nonaqueous-electrolyte secondary battery according to an embodiment of the invention.

Batteries employing a lithium-titanium composite oxide as a negative active material suffer a large amount of self-discharge during storage. This is presumed to be attributable to the fact that the lithium-titanium composite oxide functions at around 1.55 V (vs. Li/Li$^+$), at which a protective film is less apt to be formed on the surface of the negative electrode. Namely, the self-discharge is thought to be mainly attributable to the fact that the surface of the negative electrode employing a lithium-titanium composite oxide as a negative active material is less apt to be covered with a protective coating film serving to inhibit self-discharge, unlike the surfaces of the negative electrodes made of carbon which have a lithium insertion/release potential of 0.1 V (vs. Li/Li$^+$). This self-discharge occurs more markedly when a carbonaceous substance is used as a negative-electrode conductive material. The reason for this is thought to be as follows. At around 1.55 V (vs. Li/Li$^+$), which is the insertion/release potential for the lithium-titanium composite oxide, a protective coating film is less apt to be formed also on the surface of the carbonaceous substance as a conductive material. The carbon having no protective coating film has far higher reactivity with the electrolyte than the lithium-titanium composite oxide, and this leads to the enhanced self-discharge.

According to a first aspect of the present invention, the negative electrode contains both a lithium-titanium composite oxide as a negative active material and at least one member selected from lithium carbonate, lithium sulfide, lithium phosphide, and lithium fluoride. The at least one member selected from lithium carbonate, lithium sulfide, lithium phosphide, and lithium fluoride is hereinafter referred to also as "first substance". By adding the first substance, which has a lower potential than the lithium-titanium composite oxide and is electrochemically stable, the potential of the lithium-titanium composite oxide can be shifted to the lower-potential side and self-discharge can be inhibited.

Such a negative electrode is obtained, for example, by incorporating the first substance in a powder form during electrode production. The first substance to be incorporated during electrode production does not contribute to charge/discharge reactions. Consequently, when this negative electrode is used, self-discharge can be inhibited without causing any electrode volume change and without influencing cycle life.

The content of the first substance is preferably regulated to 1% by weight or higher based on the weight of the negative electrode excluding the current collector. Thus, the effect of inhibiting self-discharge can be further heightened. It is also preferred that the upper limit of the content thereof should be 20% by weight from the standpoint of securing a sufficient energy density. A more preferred range of the content thereof is 3-10% by weight.

Embodiments of the invention are explained below by reference to the drawings. In the embodiments, like members or parts are designated by like numerals or signs, and duplicates of explanation are omitted. The drawings are diagrammatic views for illustrating the embodiment of the invention and facilitating the understanding thereof. Although each drawing includes parts differing in shape, dimension, ratio, etc. from those in an actual device, the designs of such parts can be suitably modified while taking account of the following explanation and known techniques.

Figure 2:
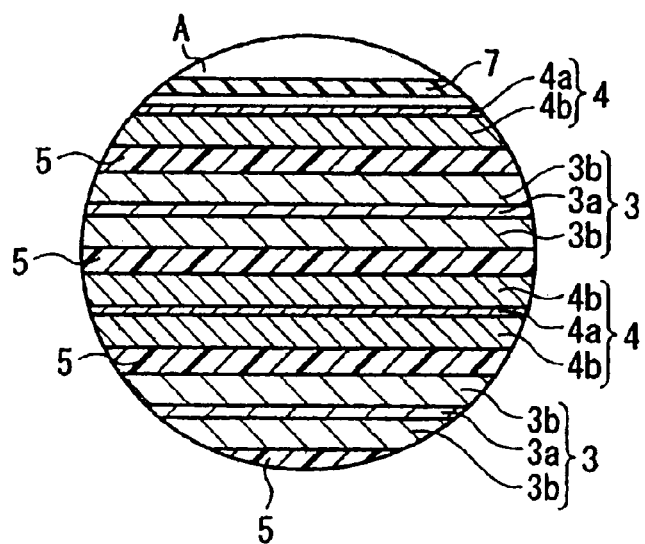
FIG. 2 is a diagrammatic sectional view showing in detail that part in FIG. 1 which is surrounded by the circle A.

The structure of one embodiment of the nonaqueous-electrolyte battery of the invention is explained by reference to FIG. 1 and FIG. 2. In FIG. 1 is shown a diagrammatic sectional view of a flat type nonaqueous-electrolyte secondary battery as an embodiment of the invention. FIG. 2 is a diagrammatic sectional view showing in detail that part in FIG. 1 which is surrounded by the circle A.

As shown in FIG. 1, a flat wound electrode group 6 is held in a case member 7. The wound electrode group 6 has a structure obtained by spirally winding a positive electrode 3 and a negative electrode 4 together with separators 5 interposed between these. A nonaqueous electrolyte is held by the wound electrode group 6.

As shown in FIG. 2, the negative electrode 4 constitutes the outermost lap of the wound electrode group 6, and the positive electrode 3 and the negative electrode 4 have been alternately stacked through separators 5 so that the following layers are disposed on the inner side of that outermost-lap negative electrode 4 in the following order: a separator 5, positive electrode 3, separator 5, negative electrode 4, separator 5, positive electrode 3, and separator 5. The negative electrode 4 includes a negative-electrode current collector 4a and a layer 4b containing a negative active material and deposited on the negative-electrode current collector 4a. In that part of the negative electrode 4 which constitutes the outermost lap, the layer 4b containing a negative active material has been formed on only one side of the negative-electrode current collector 4a. The positive electrode 3 includes a positive-electrode current collector 3a and a layer 3b containing a positive active material and deposited on the positive-electrode current collector 3a.

As shown in FIG. 1, a strip-form positive-electrode terminal 1 has been electrically connected to that part of the positive-electrode current collector 3a which is located near to the peripheral end of the wound electrode group 6. On the other hand, a strip-form negative-electrode terminal 2 has been electrically connected to that part of the negative-electrode current collector 4a which is located near to the peripheral end of the wound electrode group 6. An end of the positive-electrode terminal 1 and an end of the negative-electrode terminal 2 have been drawn out from the same edge of the case member 7.

The negative electrode, nonaqueous electrolyte, positive electrode, separators, case member, positive-electrode terminal, and negative-electrode terminal are explained below in detail.

1) Negative Electrode

The negative electrode includes a negative-electrode current collector and a layer containing a negative active material and deposited on one side or each side of the negative-electrode current collector. The layer containing a negative active material includes a lithium-titanium composite oxide, the first substance (at least one member selected from lithium carbonate, lithium sulfide, lithium phosphide, and lithium fluoride), a negative-electrode conductive material, and a binder. In this negative electrode, the lithium-titanium composite oxide and the first substance are present as a mixture of these. The presence of the lithium-titanium composite oxide and the first substance can be ascertained by examining an X-ray diffraction pattern. That the lithium-titanium composite oxide and the first substance each are independent particles (particles spatially apart from one another) can be ascertained by examining a surface or section of the negative electrode by SEM/EDX. The content of the first substance (at least one member selected from lithium carbonate, lithium sulfide, lithium phosphide, and lithium fluoride) in the layer containing a negative active material can be ascertained through the water washing of the layer containing a negative active material. The first substance is water-soluble, while the lithium-titanium composite oxide is insoluble. Because of this, the layer containing a negative active material is taken out and washed with water to measure the weight of the negative electrode (excluding the negative-electrode current collector) before and after the water washing. The content of the first substance can be determined from these measured values.

As the negative active material is used a lithium-titanium composite oxide. A lithium-titanium composite oxide is a substance which changes little in structure with charge/discharge and has excellent charge/discharge cycle performance.

Examples of the lithium-titanium composite oxide include lithium-titanium oxides having a spinel structure, ramsdellite structure, or the like and lithium-titanium composite oxides in which part of the constituent elements has been replaced with one or more other elements. Examples of the lithium-titanium oxides having a spinel structure include $Li_{4+x}Ti_5O_{12}$ ($0 \leq x \leq 3$). Examples of the lithium-titanium oxides having a ramsdellite structure include $Li_{2+y}Ti_3O_7$ ($0 \leq y \leq 3$). With respect to the molar proportion of oxygen, that in spinel $Li_{4+x}Ti_5O_{12}$ ($0 \leq x \leq 3$) and that in ramsdellite $Li_{2+y}Ti_3O_7$ ($0 \leq y \leq 3$) are formally expressed as 12 and 7, respectively. However, these values can change due to the influence of oxygen non-stoichiometry, etc.

From the standpoint of cycle life, the lithium-titanium composite oxide preferably is lithium titanate having a spinel structure. $Li_{4+x}Ti_5O_{12}$ ($0 \leq x \leq 3$) having a spinel structure is preferred because it is excellent especially in the efficiency of initial charge/discharge and satisfactorily produces the effect of improving the cycle characteristics of this embodiment.

Self-discharge becomes more marked as the specific surface area of the lithium-titanium composite oxide increases. This is because an increase in specific surface area results in an increase in the amount of lithium release sites. Consequently, the embodiment of the invention is effective especially when a negative active material having a large specific surface area is used. A remarkable effect is obtained when the negative active material has a BET specific surface area exceeding 10 $m^2/g$. In order to increase specific surface area, particle diameter is reduced. Consequently, when the lithium-titanium composite oxide has an average particle diameter of 1 μm or smaller, a remarkable effect is obtained.

As described above, it is desirable that the lithium-titanium composite oxide should have an average particle diameter of 1 μm or smaller and a specific surface area, as determined by the $N_2$ adsorption BET method, of 10 $m^2$/g or larger. It should, however, be noted that when the lithium-titanium composite oxide has too small an average particle diameter or too large a specific surface area, there is a possibility that the nonaqueous electrolyte might be distributed mainly on the negative-electrode side and the positive electrode might become deficient in the electrolyte material. Consequently, the lower limit of the average particle diameter thereof and the upper limit of the specific surface area thereof preferably are 0.001 μm and 50 $m^2$/g, respectively.

In order to inhibit the self-discharge, at least one member (first substance) selected from lithium carbonate, lithium sulfide, lithium phosphide, and lithium fluoride is incorporated into the negative electrode. The first substance preferably is lithium carbonate and/or lithium fluoride, each of which has low solubility in the electrolyte and low reactivity with the lithium/titanium oxide. The first substance may also be one member selected from lithium sulfide, lithium phosphide, and lithium fluoride or two or more members selected from these. When lithium fluoride is incorporated alone, this produces the effect that the battery in a lowly charged state (low SOC) has a reduced negative-electrode resistance. In the case where two or more members are incorporated, the effect that the negative-electrode resistance in the battery having a low SOC is further reduced can be obtained when lithium fluoride and lithium carbonate are used in combination.

The first substance is in the form of powder preferably having a particle size of 1-30 μm. By regulating the particle size to 1 μm or larger, the electrolyte can be inhibited from localizing in areas near the first substance, whereby the effect that the active material is inhibited from becoming deficient in the electrolyte can be obtained. By regulating the particle size to 30 μm or smaller, the effects that the first substance is inhibited from localizing within the electrode and that stable application is possible can be obtained. The particle size of the first substance is more preferably 1-10 μm.

The porosity of the negative electrode (excluding the current collector) is desirably regulated to 20-50%. Thus, the negative electrode can have an excellent affinity for the nonaqueous electrolyte and a high density. A more preferred range of the porosity of the negative electrode is 25-40%.

The negative-electrode current collector preferably is an aluminum foil or an aluminum alloy foil. It is preferred that the negative-electrode current collector should have an average crystal grain diameter of 50 μm or smaller. This current collector can have greatly enhanced strength and, hence, the negative electrode can be highly densified by pressing at a high pressure. An increase in battery capacity can hence be attained. Furthermore, this current collector can be prevented from suffering dissolution/corrosion deterioration in overdischarge cycling in a high-temperature atmosphere (40° C. or higher) and can hence inhibit negative-electrode impedance from increasing. In addition, output characteristics, suitability for rapid charge, and charge/discharge cycle characteristics can also be improved. A more preferred range of the average crystal grain diameter of the negative-electrode current collector is up to 30 μm, and an even more preferred range thereof is up to 5 μm.

The average crystal grain diameter is determined in the following manner. The structure in a surface of the current collector is examined with an optical microscope, and the number n of crystal grains present in an area of 1 mm×1 mm is determined. This value of n is used to determine the average crystal grain area S using the equation $S=1\times10^6/n$ ($\mu m^2$). From the value of S obtained, the average crystal grain diameter d (μm) is calculated using the following equation (1).

$$d=2(S/\pi)^{1/2} \qquad (1)$$

The aluminum foil or aluminum alloy foil having an average crystal grain diameter in the range up to 50 μm is complicatedly influenced by factors including material structure, impurities, processing conditions, and heat treatment conditions. The crystal grain diameter is regulated in production steps by combining those factors.

The thickness of the aluminum foil or aluminum alloy foil may be 20 μm or smaller, and is more preferably 15 μm or smaller. The aluminum foil preferably has a purity of 99% or higher. The aluminum alloy preferably is an alloy containing an element such as magnesium, zinc, or silicon. On the other hand, the content of transition metals such as iron, copper, nickel, and chromium is preferably regulated to 1% or lower.

As the conductive material, a carbon material can, for example, be used. Examples of the carbon material include acetylene black, carbon black, coke, carbon fibers, and graphite. Examples of the conductive material further include a metal powder such as an aluminum powder and a conductive ceramic such as TiO. More preferred are a powder of coke, graphite, or TiO which has undergone a heat treatment at a temperature of 800-2,000° C. and has an average particle diameter of 10 μm or smaller and carbon fibers having an average diameter of 1 μm or smaller. The carbon material preferably has a BET specific surface area as determined through $N_2$ adsorption of 10 $m^2$/g or larger.

Examples of the binder include polytetrafluoroethylene (PTFE), poly(vinylidene fluoride) (PVdF), fluororubbers, styrene/butadiene rubbers, and core/shell binders.

With respect to the ratio in which the negative active material, negative-electrode conductive material, and binder are mixed together, the proportion of the negative active material is preferably in the range of from 70% by weight to 96% by weight and that of the negative-electrode conductive material is preferably in the range of from 2% by weight to 28% by weight. Furthermore, the proportion of the binder is preferably in the range of from 2% by weight to 28% by weight. In case where the proportion of the negative-electrode conductive material is smaller than 2% by weight, the layer containing the negative active material has a reduced current-collecting ability, resulting in a possibility that the nonaqueous-electrolyte secondary battery might have reduced high-current characteristics. In case where the proportion of the binder is smaller than 2% by weight, the layer containing the negative active material shows reduced adhesion to the negative-electrode current collector, resulting in a possibility that cycle characteristics might decrease. On the other hand, from the standpoint of increasing capacity, the proportions of the negative-electrode conductive material and the binder are preferably up to 28% by weight each.

The negative electrode is produced, for example, by suspending the negative active material, negative-electrode conductive material, and binder in a solvent in common use to prepare a slurry, applying the slurry to a negative-electrode current collector, drying the coating to form a layer containing the negative active material, and then pressing the resultant structure.

2) Nonaqueous Electrolyte

Examples of the nonaqueous electrolyte include a liquid nonaqueous electrolyte prepared by dissolving one or more electrolyte materials in an organic solvent and a gel-state nonaqueous electrolyte obtained by combining one or more liquid electrolyte materials with a polymeric material.

It is preferred that an ordinary-temperature-molten salt which is a nonflammable ionic liquid having no volatility should be incorporated into the nonaqueous electrolyte.

Examples of the electrolyte materials include lithium salts such as lithium perchlorate ($LiClO_4$), lithium phosphate hexafluoride ($LiPF_6$), lithium borate tetrafluoride ($LiBF_4$), arsenic lithium hexafluoride ($LiAsF_6$), lithium trifluoromethanesulfonate ($LiCF_3SO_3$), and bistrifluoromethylsulfonylimidolithium [$LiN(CF_3SO_2)_2$]. One electrolyte material or two or more electrolyte materials may be used. It is preferred to use one or more electrolyte materials which are less apt to be oxidized even at high potentials. Most preferred is $LiPF_6$.

Examples of the organic solvent include cyclic carbonates such as propylene carbonate (PC), ethylene carbonate (EC), and vinylene carbonate, chain carbonates such as diethyl carbonate (DEC), dimethyl carbonate (DMC), and methyl ethyl carbonate (MEC), cyclic ethers such as tetrahydrofuran (THF), 2-methyltetrahydrofuran (2MeTHF), and dioxolane (DOX), chain ethers such as dimethoxyethane (DME) and diethoxyethane (DEE), γ-butyrolactone (GBL), acetonitrile (AN), and sulfolane (SL). Such compounds may be used alone or as a mixture of two or more thereof.

Examples of the polymeric material include poly(vinylidene fluoride) (PVdF), polyacrylonitrile (PAN), and poly(ethylene oxide) (PEO).

Preferred examples of the organic solvent include mixed solvents obtained by mixing two or more members selected from the group consisting of propylene carbonate (PC), ethylene carbonate (EC), and γ-butyrolactone (GBL). More preferred examples of the organic solvent include such mixed solvents including γ-butyrolactone (GBL). The reasons for this are as follows.

First, γ-butyrolactone, propylene carbonate, and ethylene carbonate are high in boiling point and flash point and have excellent thermal stability.

Secondly, the lithium-titanium composite oxide inserts/releases lithium ions in a potential region around 1.5 V (vs. $Li/Li^+$). However, in this potential region, the nonaqueous electrolyte is less apt to be reduced/decomposed and a product of reduction of the nonaqueous electrolyte is less apt to form a coating film on the surface of the lithium-titanium composite oxide. Because of this, when the battery is stored in a lithium insertion state, i.e., in a charged state, the lithium ions inserted in the lithium-titanium composite oxide gradually diffuse into the electrolyte to cause the so-called self-discharge. This self-discharge is marked when the temperature of the battery storage environment is high.

γ-Butyrolactone is more apt to be reduced than chain carbonates and cyclic carbonates. Specifically, the following compounds are more reducible in the following order: γ-butyrolactone>>>ethylene carbonate>propylene carbonate>>dimethyl carbonate>methyl ethyl carbonate>diethyl carbonate. Incidentally, solvents separated by a larger number of >s have a larger difference in reactivity between these.

Consequently, when γ-butyrolactone is incorporated into the electrolyte, a satisfactory coating film is formed on the surface of the lithium-titanium composite oxide even at a potential in a range where the lithium-titanium composite oxide works. As a result, self-discharge can be inhibited and the high-temperature storability of the nonaqueous-electrolyte battery can be improved.

When the mixed solvent described above is used, the same effect is produced.

Furthermore, also in the case where the ordinary-temperature-molten salt, which is susceptible to reduction, is used, the same effect is obtained. In addition, the ordinary-temperature-molten salt is susceptible also to oxidation and, hence, has the effect of acting on the positive electrode to inhibit self-discharge and improve cycle life.

For forming a protective coating film of better quality, it is preferred to regulate the content of γ-butyrolactone so as to be from 40% by volume to 95% by volume based on the organic solvent.

The liquid nonaqueous electrolyte is prepared, for example, by dissolving one or more electrolyte materials in an organic solvent in a concentration of from 0.5 mol/L to 2.5 mol/L.

An explanation is then given on the nonaqueous electrolyte containing an ordinary-temperature-molten salt.

The ordinary-temperature-molten salt means a salt which is at least partly liquid at ordinary temperature. The term "ordinary temperature" means any temperature in a temperature range where power sources are supposed to generally work. The temperature range where power sources are supposed to generally work is a range whose upper limit is about 120° C., or about 60° C. in some cases, and whose lower limit is about −40° C., or about −20° C. in same cases. A range of from −20° C. to 60° C. is preferable.

As an ordinary-temperature-molten salt including a lithium ion, it is desirable to use an ionic molten substance constituted of a lithium ion, an organic cation, and an anion. This ionic molten substance preferably is liquid even at temperatures not higher than room temperature.

Examples of the organic cation include alkylimidazolium ions and quaternary ammonium ions each having the framework represented by the following formula.

Preferred examples of the alkylimidazolium ions include a dialkylimidazolium ion, trialkylimidazolium ion, and tetraalkylimidazolium ion. The dialkylimidazolium ion preferably is a 1-methyl-3-ethylimidazolium ion ($MEI^+$). The trialkylimidazolium ion preferably is a 1,2-diethyl-3-propylimidazolium ion ($DMPI^+$). The tetraalkylimidazolium ion preferably is a 1,2-diethyl-3,4(5)-dimethylimidazolium ion.

Preferred examples of the quaternary ammonium ions include a tetraalkylammonium ion and a cyclic ammonium ion. The tetraalkylammonium ion preferably is a dimethylethylmethoxyammonium ion, dimethylethylmethoxymethylammonium ion, dimethylethylethoxyethylammonium ion, or trimethylpropylammonium ion.

By using any of those alkylimidazolium ions or quaternary ammonium ions (preferably, a tetraalkyl-ammonium ion), the melting point can be lowered to 100° C. or below, more preferably 20° C. or below. In addition, reactivity with the negative electrode can be reduced.

The concentration of the lithium ion is preferably 20 mol % or lower. A more preferred range thereof is 1-10 mol %. By regulating the lithium ion concentration so as to be within that range, an ordinary-temperature-molten salt which is liquid even at temperatures as low as 20° C. and below can be easily formed. In addition, the molten salt can have a reduced viscosity even at temperatures not higher than ordinary temperature and have an increased ionic conductivity.

Examples of the anion include one or more members selected from $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, $(CF_3SO_2)_3C^-$, and the like. It is preferred that two or more members selected from these anions should coexist. By causing such two or more anions to coexist, an ordinary-temperature-molten salt having a melting point of 20° C. or lower can be easily formed. More preferably, an ordinary-temperature-molten salt having a melting point of 0° C. or lower can be formed. More preferred examples of the anion include $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. With these anions, an ordinary-temperature-molten salt having a melting point of 0° C. or lower can be more easily formed.

3) Positive Electrode

The positive electrode includes a positive-electrode current collector and a layer containing a positive active material. The layer includes a positive active material, a positive-electrode conductive material, and a binder and has been deposited on one side or each side of the positive-electrode current collector.

Examples of the positive active material include oxides, sulfides, and polymers.

Examples of the oxides include manganese dioxide ($MnO_2$), iron oxide, copper oxide, and nickel oxide which each have inserted lithium, lithium-manganese composite oxides (e.g., $Li_xMn_2O_4$ or $Li_xMnO_2$), lithium-nickel composite oxides (e.g., $Li_xNiO_2$), lithium-cobalt composite oxides ($Li_xCoO_2$), lithium-nickel-cobalt composite oxides (e.g., $LiNi_{1-y}Co_yO_2$), lithium-manganese-cobalt composite oxides (e.g., $LiMn_yCo_{1-y}O_2$), spinel lithium-manganese-nickel composite oxides ($Li_xMn_{2-y}Ni_yO_4$), lithium-phosphorus oxides having the olivine structure ($Li_xFePO_4$, $Li_xFe_{1-y}Mn_yPO_4$, $Li_xCoPO_4$, etc.), iron sulfate ($Fe_2(SO_4)_3$), vanadium oxides (e.g., $V_2O_5$), and lithium-nickel-cobalt-manganese composite oxides.

Examples of the polymers include conductive polymeric materials such as polyaniline and polypyrrole and disulfide-based polymeric materials. Also usable besides these are sulfur (S), fluorocarbons, and the like.

Examples of positive active materials with which a high positive-electrode voltage is obtained include lithium-manganese composite oxides ($Li_xMn_2O_4$), lithium-nickel composite oxides ($Li_xNiO_2$), lithium-cobalt composite oxides ($Li_xCoO_2$), lithium-nickel-cobalt composite oxides ($Li_xNi_{1-y}Co_yO_2$) spinel lithium-manganese-nickel composite oxides ($Li_xMn_{2-y}Ni_yO_4$), lithium-manganese-cobalt composite oxides ($Li_xMn_yCo_{1-y}O_2$), lithium iron phosphates ($Li_xFePO_4$), and lithium-nickel-cobalt-manganese composite oxides. Incidentally, x and y each preferably is in the range of 0-1.

Examples of the lithium-nickel-cobalt-manganese composite oxides include $Li_aNi_bCo_cMn_dO_2$ (provided that the molar proportions a, b, c, and d satisfy $0 \leq a < 1.1$, $0.1 \leq b \leq 0.5$, $0 \leq c \leq 0.9$, and $0.1 \leq d \leq 0.5$).

From the standpoint of cycle characteristics, it is preferred that the negative electrode described above should be used in combination with an oxide containing both lithium and nickel as the positive active material. Preferred of such oxides from the standpoint of thermal stability is an oxide represented by the empirical formula $Li_aNi_bCo_cMn_dO_2$ ($0 \leq a \leq 1.1$, $0.1 \leq b \leq 0.5$, $0 \leq c \leq 0.9$, and $0.1 \leq d \leq 0.5$).

Furthermore, when the negative electrode described above is used in combination with a spinel lithium-manganese-nickel composite oxide as the positive active material, a battery having a higher voltage can be provided. Alternatively, when a lithium-phosphorus composite oxide having the olivine structure (e.g., $Li_xFePO_4$, $Li_xFe_{1-x}Mn_yPO_4$, $Li_xVPO_4F$, or $Li_xCoPO_4$, wherein $0 \leq x \leq 1$ and $0 \leq y \leq 1$) is included in the positive active material, then a nonaqueous-electrolyte battery having excellent thermal stability can be realized.

In the case where a nonaqueous electrolyte containing an ordinary-temperature-molten salt is used, it is preferred from the standpoint of cycle life to use a lithium iron phosphate, $Li_xVPO_4F$, lithium-manganese composite oxide, lithium-nickel composite oxide, or lithium-nickel-cobalt composite oxide. This is because these positive active materials have reduced reactivity with the ordinary-temperature-molten salt.

The positive active material has a primary-particle diameter of preferably from 100 nm to 1 μm. When the active material has a primary-particle diameter of 100 nm or larger, this material is easy to handle in industrial production. When the primary-particle diameter thereof is 1 μm or smaller, the diffusion of lithium ions within the solid can proceed smoothly.

The positive active material has a specific surface area of preferably from 0.1 m²/g to 10 m²/g. When the active material has a specific surface area of 0.1 m²/g or larger, insertion/release sites for lithium ions are sufficiently secured. When the specific surface area thereof is 10 m²/g or smaller, this active material is easy to handle in industrial production and satisfactory charge/discharge cycle performance can be secured.

Examples of the positive-electrode conductive material, which functions to enhance current-collecting ability and reduce the resistance of contact with the current collector, include carbonaceous substances such as acetylene black, carbon black, and graphite.

Examples of the binder for binding the positive active material to the positive-electrode conductive material include polytetrafluoroethylene (PTFE), poly(vinylidene fluoride) (PVdF), and fluororubbers.

With respect to the ratio in which the positive active material, positive-electrode conductive material, and binder are mixed together, the proportion of the positive active material is preferably in the range of from 80% by weight to 95% by weight and that of the positive-electrode conductive material is preferably in the range of from 3% by weight to 18% by weight. Furthermore, the proportion of the binder is preferably in the range of from 2% by weight to 17% by weight. With respect to the positive-electrode conductive material, proportions thereof not smaller than 3% by weight enable the conductive material to produce the effects described above, while proportions thereof not larger than 18% by weight are effective in diminishing the decomposition of the nonaqueous electrolyte on the surface of the positive-electrode conductive material during high-temperature storage. With respect to the binder, proportions thereof not smaller than 2% by weight give sufficient electrode strength, while proportions thereof not larger than 17% by weight are effective in reducing the internal resistance of the electrode because of the reduced insulator amount in the electrode.

The positive-electrode current collector preferably is an aluminum foil or an aluminum alloy foil, and has an average crystal grain diameter of preferably 50 μm or smaller like the negative-electrode current collector. The average crystal grain diameter thereof is more preferably 30 μm or smaller, even more preferably 5 μm or smaller. When the aluminum foil or aluminum alloy foil has an average crystal grain diameter of 50 μm or smaller, this foil can have greatly enhanced strength and the positive electrode can be highly densified at a high pressing pressure. Thus, an increase in battery capacity can be attained.

The aluminum foil or aluminum alloy foil having an average crystal grain diameter in the range up to 50 μm is complicatedly influenced by factors including material structure, impurities, processing conditions, heat treatment history, and annealing conditions. The crystal grain diameter is regulated in production steps by combining those factors.

The thickness of the aluminum foil or aluminum alloy foil may be 20 μm or smaller, and is more preferably 15 μm or smaller. The aluminum foil preferably has a purity of 99% or higher. The aluminum alloy preferably is an alloy containing an element such as magnesium, zinc, or silicon. On the other hand, the content of transition metals such as iron, copper, nickel, and chromium is preferably regulated to 1% or lower.

The positive electrode is produced, for example, by suspending the positive active material, positive-electrode conductive material, and binder in an appropriate solvent to prepare a slurry, applying the slurry to a positive-electrode current collector, drying the coating to form a layer containing the positive active material, and then pressing the resultant structure. Alternatively, the positive active material, positive-electrode conductive material, and binder may be formed into a pellet for use as a layer containing the positive active material.

4) Separators

Examples of the separators include porous films including polyethylene, polypropylene, cellulose, or poly(vinylidene fluoride) (PVdF) and nonwoven fabrics made of synthetic resins. Of such materials, a porous film made of polyethylene or polypropylene is preferred from the standpoint of safety improvement because this film melts at a given temperature to stop the current.

5) Case Member

Examples of the case member include laminated films having a thickness of 0.2 mm or smaller and metallic containers having a wall thickness of 0.5 mm or smaller. The wall thickness of the metallic containers is more preferably 0.2 mm or smaller.

Examples of the shape include flat, prismatic, cylindrical, coin, button, sheet, and multilayer shapes. It is a matter of course that the battery may be a small battery for mounting in portable electronic appliances or a large battery for mounting on two- to four-wheeled vehicles, etc.

The laminated films may be multilayered films composed of a metal layer and a resin layer with which the metal layer is coated. From the standpoint of weight reduction, the metal layer preferably is an aluminum foil or aluminum alloy foil. The resin layer is for reinforcing the metal layer. For forming the resin layer, use can be made of a polymer such as polypropylene (PP), polyethylene (PE), nylon, or poly (ethylene terephthalate) (PET). The laminated films are formed by sealing by thermal fusion.

Examples of the material of the metallic containers include aluminum and aluminum alloys. The aluminum alloys preferably are alloys containing an element such as magnesium, zinc, or silicon. On the other hand, the content of transition metals such as iron, copper, nickel, and chromium is preferably regulated to 1% or lower. Use of such a metallic container can greatly improve long-term reliability and heat-dissipating properties in a high-temperature environment.

The metallic can made of aluminum or an aluminum alloy has an average crystal grain diameter of preferably 50 μm or smaller, more preferably 30 μm or smaller, even more preferably 5 μm or smaller. When the average crystal grain diameter thereof is 50 μm or smaller, the metallic can made of aluminum or an aluminum alloy can have greatly enhanced strength and a further reduced wall thickness. As a result, a battery which is lightweight, has a high output and excellent long-term reliability, and is preferable for mounting in vehicles can be realized.

6) Negative-Electrode Terminal

The negative-electrode terminal may be made of a material which has electrical stability in the potential range of from 0.3 V to 3 V based on lithium ion/metal and further has electrical conductivity. Examples of the material include aluminum and aluminum alloys containing an element such as Mg, Ti, Zn, Mn, Fe, Cu, or Si. From the standpoint of reducing contact resistance, it is preferred to use the same material as the negative-electrode current collector.

7) Positive-Electrode Terminal

The positive-electrode terminal may be made of a material which has electrical stability in the potential range of from 3 V to 5 V based on lithium ion/metal and further has electrical conductivity. Examples of the material include aluminum and aluminum alloys containing an element such as Mg, Ti, Zn, Mn, Fe, Cu, or Si. From the standpoint of reducing contact resistance, it is preferred to use the same material as the positive-electrode current collector.

Figure 3:
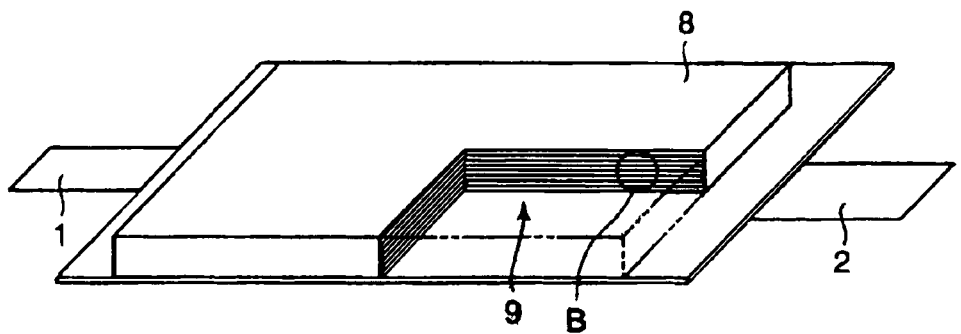
FIG. 3 is a partially cutaway slant view diagrammatically illustrating a flat type nonaqueous-electrolyte secondary battery according to another embodiment of the invention.
Figure 4:
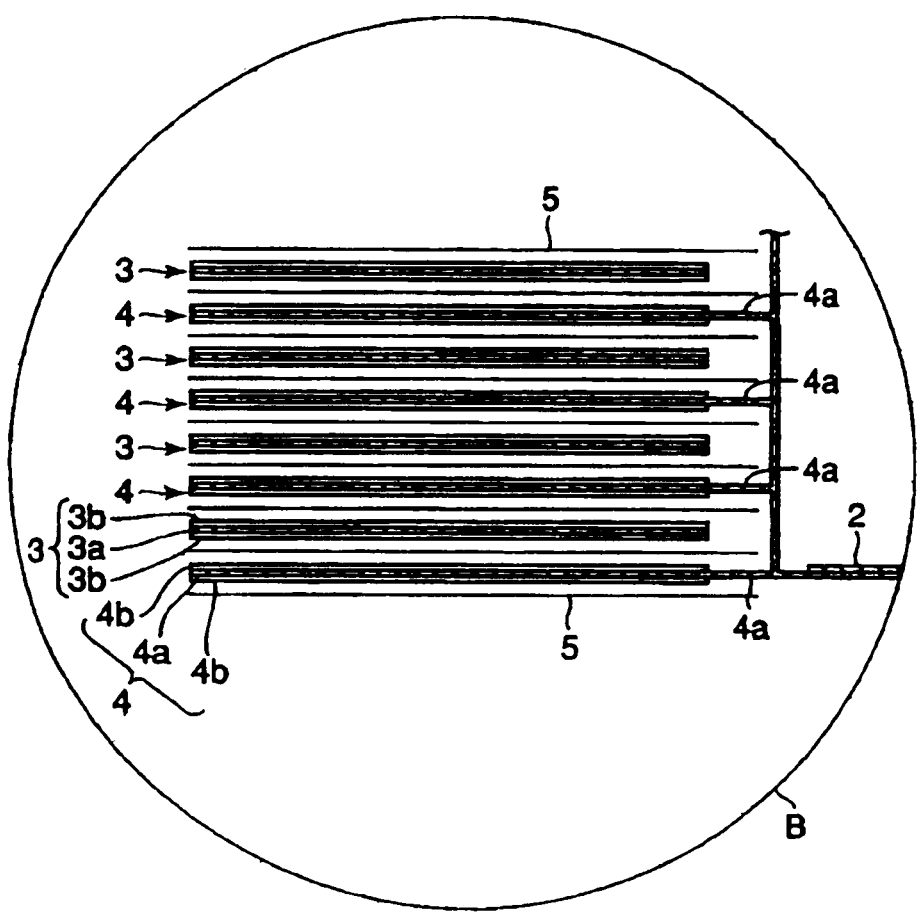
FIG. 4 is an enlarged sectional view of the part B in FIG. 3.

The constitution of the nonaqueous-electrolyte battery as an embodiment of the invention should not be construed as being limited to that shown in FIG. 1 and FIG. 2 described above. For example, the nonaqueous-electrolyte battery can be produced so as to have the constitution shown in FIG. 3 and FIG. 4. FIG. 3 is a partially cutaway slant view diagrammatically illustrating another flat type nonaqueous-electrolyte secondary battery as another embodiment of the invention. FIG. 4 is an enlarged sectional view of the part B in FIG. 3.

As shown in FIG. 3, a multilayer type electrode group 9 is held in a case member 8 made of a laminated film. The multilayer type electrode group 9 has a structure formed by alternately stacking a positive electrode 3 and a negative electrode 4 together with a separator 5 interposed between these, as shown in FIG. 4. There are more than one positive electrode 3, and each positive electrode 3 is composed of a positive-electrode current collector 3a and layers 3b containing a positive active material and deposited respectively on both sides of the positive-electrode current collector 3a. There are more than one negative electrode 4, and each negative electrode 4 is composed of a negative-electrode current collector 4a and layers 4b containing a negative active material and deposited respectively on both sides of the negative-electrode current collector 4a. One edge of the negative-electrode current collector 4a of each negative electrode 4 protrudes from the positive electrodes 3. Those parts of the negative-electrode current collectors 4a which are protrudent from the positive electrodes 3 have been electrically connected to a strip-form negative-electrode terminal 2. An end of the strip-form negative-electrode terminal 2 has been drawn out from the case member 8. Furthermore, that edge of the positive-electrode current collector 3a of each positive electrode 3 which is located on the side opposite to the protrudent edges of the negative-electrode current collectors 4a protrudes from the negative electrodes 4, although this is not shown in the figure. Those parts of the positive-electrode current collectors 3a which are protrudent from the negative electrodes 4 have been electrically connected to a strip-form positive-electrode terminal 1. An end of the strip-form positive-electrode terminal 1 is located on the side opposite to the negative-electrode terminal 2 and has been drawn out from an edge of the case member 8.

The battery pack as a further embodiment of the invention includes battery cells according to either of the embodiments of the invention described hereinabove. These battery cells have been connected in an electrically serial or parallel arrangement to constitute a battery assembly.

The battery cells according to the embodiments of the invention are preferable for use in fabricating a battery assembly, and the battery pack as an embodiment of the invention has excellent cycle characteristics. As each of the battery cells can be used the flat type battery shown in FIG. 1 or FIG. 3.

Figure 5:
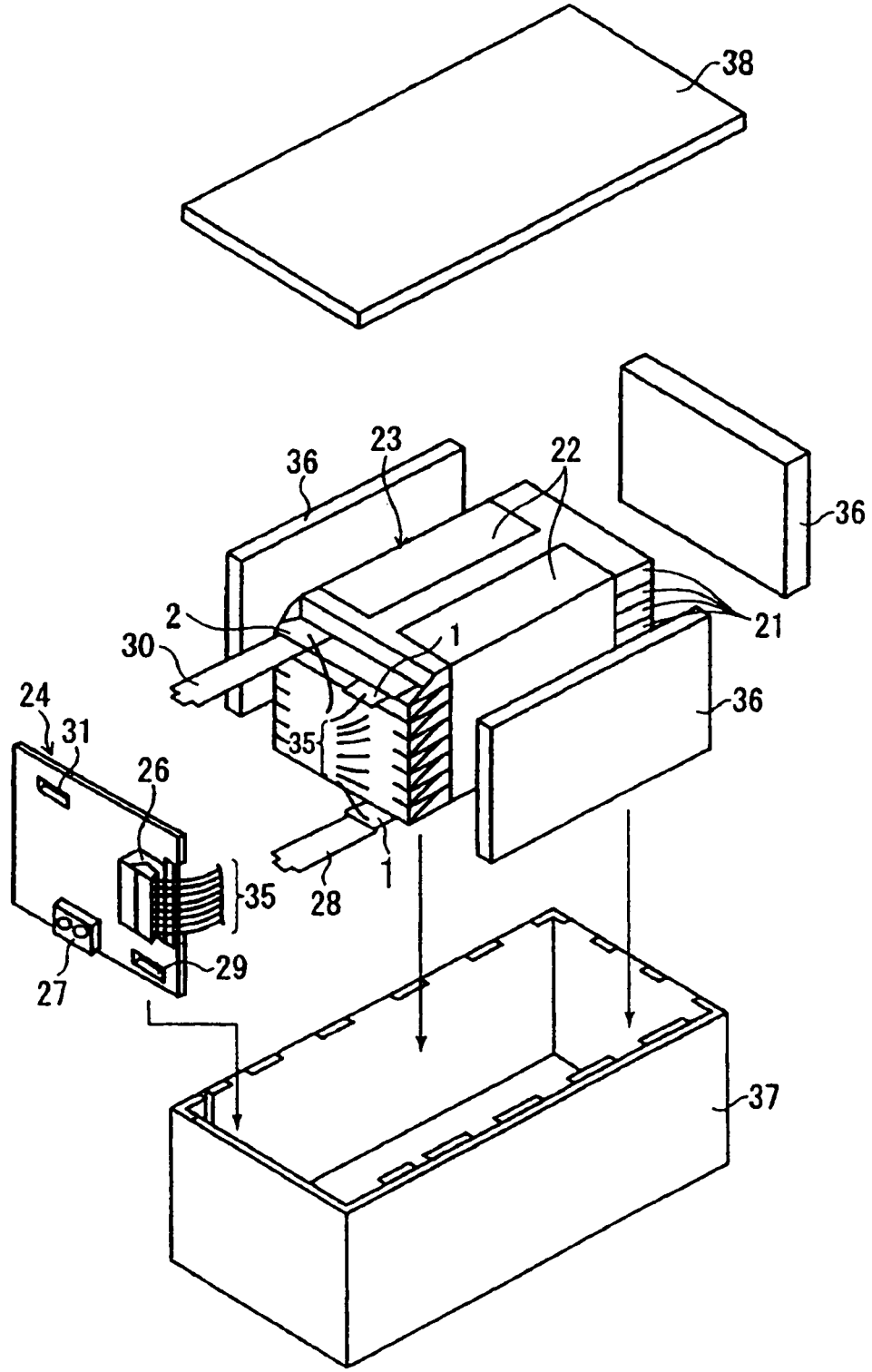
FIG. 5 is an exploded slant view of a battery pack according to a further embodiment of the invention.
Figure 6:
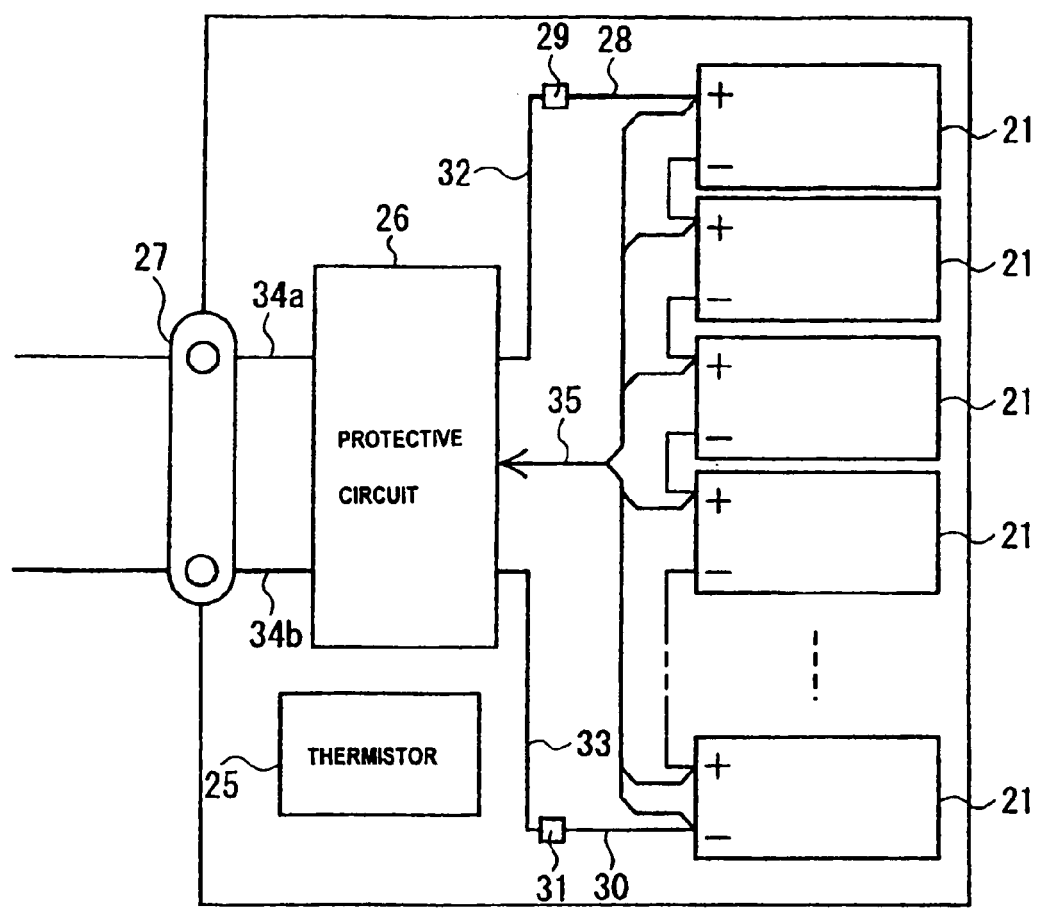
FIG. 6 is a block diagram showing an electrical circuit of the battery pack of FIG. 5.

In the battery pack shown in FIG. 5, the cells 21 constituted of flat type nonaqueous-electrolyte batteries have been stacked so that the negative-electrode terminals 2 and the positive-electrode terminals 1 project outward in the same direction, and bound with a pressure-sensitive adhesive tape 22 to thereby constitute a battery assembly 23. These cells 21 have been electrically serially connected as shown in FIG. 6.

A printed wiring board 24 has been disposed so as to face that side of the cells 21 on which the negative-electrode terminals 2 and positive-electrode terminals 1 project. As shown in FIG. 6, a thermistor 25, a protective circuit 26, and a terminal 27 for electrical connection to external apparatus have been mounted on the printed wiring board 24. That side of the printed wiring board 24 which faces the battery assembly 23 has an insulating sheet (not shown) for avoiding unnecessary connection to the wiring of the battery assembly 23.

A positive-electrode lead 28 has been connected to the positive-electrode terminal 1 located at the lowermost layer of the battery assembly 23, and the end thereof has been inserted in and electrically connected to a positive-electrode connector 29 of the printed wiring board 24. A negative-electrode lead 30 has been connected to the negative-electrode terminal 2 located at the uppermost layer of the battery assembly 23, and the end thereof has been inserted in and electrically connected to a negative-electrode connector 31 of the printed wiring board 24. These connectors 29 and 31 have been connected to the protective circuit 26 via wirings 32 and 33 formed on the printed wiring board 24.

The thermistor 25 measures the temperature of the cells 21, and the measurement signals are sent to the protective circuit 26. The protective circuit 26 can break, under given conditions, a plus-side wiring 34a and a minus-side wiring 34b both disposed between the protective circuit 26 and the terminal 27 for connection to external apparatus. The given conditions include, for example, ones in which the temperature measured by the thermistor 25 has reached a given temperature or higher. The given conditions further include ones in which the overcharge, overdischarge, overcurrent, or the like of the cells 21 has been detected. This detection of overcharge, etc. is made for each cell 21 or for the cells 21 as a whole. In the case where overcharge, etc. is detected with respect to each cell 21, the cell voltage may be measured or the positive-electrode potential or negative-electrode potential may be measured. In the latter case, a lithium electrode for use as a reference electrode is inserted into each cell 21. In the case illustrated in FIG. 5 and FIG. 6, a wiring 35 for voltage measurement is connected to each of the cells 21, and measurement signals are sent to the protective circuit 26 through these wirings 35.

Those three sides of the battery assembly 23 which exclude the side where the positive-electrode terminals 1 and the negative-electrode terminals 2 protrude each have a protective sheet 36 disposed thereon which is made of a rubber or resin.

The battery assembly 23 is packed into a container 37 together with the protective sheets 36 and the printed wiring board 24. Namely, the protective sheets 36 are disposed respectively on the two length-direction inner faces and one width-direction inner face of the container 37, and the printed wiring board 24 is disposed on the width-direction inner face on the opposite side. The battery assembly 23 is positioned in the space surrounded by the protective sheets 36 and the printed wiring board 24. A lid 38 has been attached to the top of the container 37.

Incidentally, a heat-shrinkable tube may be used in place of the pressure-sensitive adhesive tape 22 for fixing the battery assembly 23. In this case, cells stacked are bound by disposing protective sheets respectively on both sides of the stacked cells, lapping the heat-shrinkable tube therearound, and thermally shrinking the heat-shrinkable tube.

Although the embodiment shown in FIG. 5 and FIG. 6 is one in which cells 21 are serially connected, the cells may be connected in parallel in order to increase battery capacity. It is also possible to connect assembled battery packs serially or in parallel.

The embodiment of the battery pack is suitably modified according to applications.

Preferred applications of the battery pack are ones in which suitability for cycling at a high current is desired. Specific examples thereof include use as a power source for digital cameras and mounting on vehicles such as two- to four-wheeled hybrid electric cars, two- to four-wheeled electric cars, and power-assisted bicycles. The battery pack is especially preferable for mounting on vehicles.

In the case where the nonaqueous electrolyte contains a mixed solvent prepared by mixing at least two members selected from propylene carbonate (PC), ethylene carbonate (EC), and γ-butyrolactone (GBL) or contains γ-butyrolactone (GBL), it is preferred to use the battery pack in applications where high-temperature characteristics are required. Examples of such applications include mounting on those vehicles.

The invention will be explained below by reference to Examples. However, various changes can be made therein without departing from the spirit of the invention. The invention should not be construed as being limited to the following Examples.

EXAMPLE 1

<Production of Positive Electrode>

To N-methylpyrrolidone (NMP) were added 90% by weight lithium-nickel-cobalt-manganese oxide ($LiNi_{1/3}Co_{1/3}Mn_{1/3}O_2$) powder as a positive active material, 5% by weight acetylene black as a conductive material, and 5% by weight poly(vinylidene fluoride) (PVdF). The ingredients were mixed together to prepare a slurry. This slurry was applied to each side of a current collector which was an aluminum foil having a thickness of 15 μm. The slurry applied was dried, and the coated foil was pressed to thereby produce a positive electrode having an electrode density of 3.2 g/cm$^3$.

<Production of Negative Electrode>

A spinel lithium titanate ($Li_4Ti_5O_{12}$) powder having an average particle diameter of 0.8 μm, BET specific surface area as determined through $N_2$ adsorption of 10 m$^2$/g, and lithium insertion potential of 1.55 V (vs. Li/Li$^+$) was prepared as a negative active material. A lithium fluoride powder was further prepared which had an average particle diameter of 3 μm and a BET specific surface area as determined through $N_2$ adsorption of 1.4 m$^2$/g.

To N-methylpyrrolidone (NMP) were added 85% by weight the negative active material, 5% by weight the lithium fluoride, 5% by weight coke burned at 1,300° C. ($d_{002}$=0.3465; average particle diameter, 8.2 μm; BET specific surface area, 11.2 m$^2$/g) as a conductive material, and 5% by weight poly(vinylidene fluoride) (PVdF). The ingredients were mixed together to prepare a slurry. This slurry was applied to each side of a current collector which was an aluminum foil having a thickness of 15 μm (purity, 99.3%; average crystal grain diameter, 10 μm). The slurry applied was dried, and the coated foil was pressed to thereby obtain a negative electrode having an electrode density of 2.4 g/cm³.

<Production of Electrode Group>

The positive electrode, a separator constituted of a porous polyethylene film having a thickness of 25 μm, the negative electrode, and a separator constituted of the same film were superposed in this order and then spirally wound. The resultant roll was pressed with heating at 90° C. to thereby produce a flat electrode group having a width of 30 mm and a thickness of 3.0 mm. The electrode group obtained was packed into a pack made of a laminated film having a thickness of 0.1 mm and constituted of an aluminum foil having a thickness of 40 μm and a polypropylene layer formed on each side of the aluminum foil. The electrode group in the pack was vacuum-dried at 80° C. for 24 hours.

<Preparation of Liquid Nonaqueous Electrolyte>

In a mixed solvent prepared by mixing ethylene carbonate (EC) and γ-butyrolactone (GBL) in a volume ratio (EC:GBL) of 1:2 was dissolved $LiBF_4$ as an electrolyte material in a concentration of 1.5 mol/L. Thus, a liquid nonaqueous electrolyte was prepared. This nonaqueous electrolyte had a viscosity at 20° C. of 7.1 cP.

The liquid nonaqueous electrolyte was injected into the laminated-film pack into which the electrode group had been packed. Thereafter, this pack was completely closed by heat sealing to produce a nonaqueous-electrolyte secondary battery having the structure shown in FIG. 1 and having a width of 35 mm, thickness of 3.2 mm, and height of 65 mm.

The battery obtained was charged to 2.4 V (state of charge, about 65%) and stored in a 60° C. environment for 1 month. The residual capacity after the storage was measured. The value of (capacity after storage)/(capacity before storage) is shown as retention in Table 1.

EXAMPLES 2 TO 7 AND COMPARATIVE EXAMPLE 1

Nonaqueous-electrolyte secondary batteries were produced in the same manner as in Example 1, except that the amounts of the negative active material and lithium fluoride to be added were changed to the values shown in Table 1.

EXAMPLE 8

A nonaqueous-electrolyte secondary battery was produced in the same manner as in Example 1, except that lithium sulfide was added in place of the lithium fluoride in the amount shown in Table 1.

EXAMPLE 9

A nonaqueous-electrolyte secondary battery was produced in the same manner as in Example 1, except that lithium carbonate was added in place of the lithium fluoride in the amount shown in Table 1.

EXAMPLE 10

A nonaqueous-electrolyte secondary battery was produced in the same manner as in Example 1, except that lithium phosphide was added in place of the lithium fluoride in the amount shown in Table 1.

EXAMPLE 11

A nonaqueous-electrolyte secondary battery was produced in the same manner as in Example 1, except that lithium cobalt oxide ($LiCoO_2$) was used as a positive active material.

EXAMPLE 12

A nonaqueous-electrolyte secondary battery was produced in the same manner as in Example 1, except that lithium iron phosphate ($LiFePO_4$) was used as a positive active material.

EXAMPLE 13

A nonaqueous-electrolyte secondary battery was produced in the same manner as in Example 1, except that a solution prepared by mixing ethylene carbonate (EC) with diethyl carbonate (DEC) in a volume ratio (EC:DEC) of 1:2 and dissolving $LiPF_6$ as an electrolyte material in the mixed solvent in a concentration of 1 mol/L was used as a nonaqueous electrolyte. This nonaqueous electrolyte had a viscosity at 20° C. of 1.9 cP.

EXAMPLE 14 AND COMPARATIVE EXAMPLE 2

Nonaqueous-electrolyte secondary batteries were produced in the same manners as in Example 1 and Comparative Example 1, except that $Li_2Ti_3O_7$ having an average particle diameter of 0.8 μm, BET specific surface area as determined through $N_2$ adsorption of 10 m²/g, and lithium insertion potential of 1-2 V (vs. $Li/Li^+$) was used as a negative active material.

EXAMPLE 15 AND COMPARATIVE EXAMPLE 3

Nonaqueous-electrolyte secondary batteries were produced in the same manners as in Example 1 and Comparative Example 1, except that $TiO_2$ having an average particle diameter of 0.2 μm, BET specific surface area as determined through $N_2$ adsorption of 48 m²/g, and lithium insertion potential of 1-2 V (vs. $Li/Li^+$) was used as a negative active material.

TABLE 1

| | Negative active material | | Additive to negative electrode | | Nonaqueous electrolyte | | Capacity |
|---|---|---|---|---|---|---|---|
| | Kind | wt % | Kind | wt % | Electrolyte salt | Solvent | retention (%) |
| Ex. 1 | $Li_4Ti_5O_{12}$ | 85 | LiF | 5 | $LiBF_4$ (1.5 M) | EC/GBL (1:2) | 80 |
| Comp. Ex. 1 | $Li_4Ti_5O_{12}$ | 90 | — | — | $LiBF_4$ (1.5M) | EC/GBL (1:2) | 37 |
| Ex. 2 | $Li_4Ti_5O_{12}$ | 89.9 | LiF | 0.1 | $LiBF_4$ (1.5M) | EC/GBL (1:2) | 50 |
| Ex. 3 | $Li_4Ti_5O_{12}$ | 89 | LiF | 1 | $LiBF_4$ (1.5M) | EC/GBL (1:2) | 75 |
| Ex. 4 | $Li_4Ti_5O_{12}$ | 87 | LiF | 3 | $LiBF_4$ (1.5M) | EC/GBL (1:2) | 80 |
| Ex. 5 | $Li_4Ti_5O_{12}$ | 80 | LiF | 10 | $LiBF_4$ (1.5M) | EC/GBL (1:2) | 78 |

TABLE 1-continued

| | Negative active material | | Additive to negative electrode | | Nonaqueous electrolyte | | Capacity |
|---|---|---|---|---|---|---|---|
| | Kind | wt % | Kind | wt % | Electrolyte salt | Solvent | retention (%) |
| Ex. 6 | $Li_4Ti_5O_{12}$ | 70 | LiF | 20 | $LiBF_4$ (1.5M) | EC/GBL (1:2) | 76 |
| Ex. 7 | $Li_4Ti_5O_{12}$ | 60 | LiF | 30 | $LiBF_4$ (1.5M) | EC/GBL (1:2) | 70 |
| Ex. 8 | $Li_4Ti_5O_{12}$ | 85 | $Li_2S$ | 5 | $LiBF_4$ (1.5M) | EC/GBL (1:2) | 70 |
| Ex. 9 | $Li_4Ti_5O_{12}$ | 85 | $Li_2CO_3$ | 5 | $LiBF_4$ (1.5M) | EC/GBL (1:2) | 73 |
| Ex. 10 | $Li_4Ti_5O_{12}$ | 85 | $Li_3P$ | 5 | $LiBF_4$ (1.5M) | EC/GBL (1:2) | 70 |
| Ex. 11 | $Li_4Ti_5O_{12}$ | 85 | LiF | 5 | $LiBF_4$ (1.5M) | EC/GBL (1:2) | 80 |
| Ex. 12 | $Li_4Ti_5O_{12}$ | 85 | LiF | 5 | $LiBF_4$ (1.5M) | EC/GBL (1:2) | 85 |
| Ex. 13 | $Li_4Ti_5O_{12}$ | 85 | LiF | 5 | $LiPF_6$ (1.0M) | EC/DEC (1:2) | 70 |
| Ex. 14 | $Li_2Ti_3O_7$ | 85 | LiF | 5 | $LiBF_4$ (1.5M) | EC/GBL (1:2) | 60 |
| Comp. Ex. 2 | $Li_2Ti_3O_7$ | 90 | — | — | $LiBF_4$ (1.5M) | EC/GBL (1:2) | 30 |
| Ex. 15 | $TiO_2$ | 85 | LiF | 5 | $LiBF_4$ (1.5M) | EC/GBL (1:2) | 55 |
| Comp. Ex. 3 | $TiO_2$ | 90 | — | — | $LiBF_4$ (1.5M) | EC/GBL (1:2) | 30 |

It can be seen from Table 1 that the amount of self-discharge is reduced when the negative electrodes according to the embodiments of the invention, i.e., the negative electrodes in which lithium carbonate, lithium sulfide, lithium phosphide, or lithium fluoride coexists with a negative active material, are used.

Although embodiments of the invention were explained above, the invention should not be construed as being limited thereto and various modifications thereof are possible within the scope of the invention described in the claims. In practicing the invention, various modifications of the invention are possible without departing from the spirit of the invention. Furthermore, by suitably combining two or more of constituent elements disclosed in the embodiments, various inventions can be achieved.

What is claimed is:

1. A nonaqueous-electrolyte battery which comprises:
a positive electrode,
a nonaqueous electrolyte, and
a negative electrode which comprises
   a negative-electrode current collector, which is aluminum foil or an aluminum alloy foil, and
   a layer comprising a negative active material deposited on one or each side of the negative-electrode current collector, wherein the layer comprises at least one member selected from the group consisting of lithium sulfide, lithium phosphide and lithium fluoride, and wherein the layer further comprises at least one of a lithium-titanium composite oxide and titanium dioxide,
wherein the at least one member selected from the group consisting of lithium sulfide, lithium phosphide and lithium fluoride is present in the layer in an amount of 1-20% by weight based on the weight of the layer,
wherein the lithium-titanium composite oxide functions at 1.55 V (Li/Li$^+$),
wherein a potential of the lithium-titanium composite oxide is shifted to a lower-potential side with reference to the potential of the lithium-titanium composite oxide by the at least one member selected from the group consisting of lithium sulfide, lithium phosphide and lithium fluoride, and
wherein the at least one member selected from the group consisting of lithium sulfide, lithium phosphide, and lithium fluoride is in a powder form.

2. The nonaqueous-electrolyte battery of claim 1, wherein the lithium-titanium composite oxide has a spinel structure.

3. The nonaqueous-electrolyte battery of claim 1, wherein the layer comprises a conductive material and a binder.

4. The nonaqueous-electrolyte battery of claim 3, wherein the conductive material is a carbonaceous substance.

5. The nonaqueous-electrolyte battery of claim 1, wherein the layer comprises lithium sulfide.

6. The nonaqueous-electrolyte battery of claim 1, wherein the layer comprises lithium phosphide.

7. The nonaqueous-electrolyte battery of claim 1, wherein the layer comprises lithium fluoride.

8. The nonaqueous-electrolyte battery of claim 1, wherein the layer further comprises a lithium-titanium composite oxide.

9. The nonaqueous-electrolyte battery of claim 1, wherein the layer further comprises titanium dioxide.

10. A battery pack comprising nonaqueous-electrolyte batteries which each are a nonaqueous-electrolyte battery which comprises:
a positive electrode,
a nonaqueous electrolyte, and
a negative electrode which comprises
   a negative-electrode current collector, which is aluminum foil or an aluminum alloy foil, and
   a layer comprising a negative active material deposited on one or each side of the negative-electrode current collector, wherein the layer comprises at least one member selected from the group consisting of lithium sulfide, lithium phosphide and lithium fluoride, and wherein the layer further comprises at least one of a lithium-titanium composite oxide and titanium dioxide,
wherein the at least one member selected from the group consisting of lithium sulfide, lithium phosphide and lithium fluoride is present in the layer in an amount of 1-20% by weight based on the weight of the layer,
wherein the nonaqueous-electrolyte batteries have been electrically connected serially or in parallel,
wherein the lithium-titanium composite oxide functions at 1.55 V (Li/Li$^+$),
wherein a potential of the lithium-titanium composite oxide is shifted to a lower-potential side with reference to the potential of the lithium-titanium oxide by the at least one member selected from the group consisting of lithium sulfide, lithium phosphide and lithium fluoride, and wherein the at least one member selected from the group consisting of lithium sulfide, lithium phosphide, and lithium fluoride is in a powder form.

11. The battery pack of claim 10, which further comprises a protective circuit for measuring the voltage of the nonaqueous-electrolyte batteries.

12. The battery pack of claim 10, wherein the lithium-titanium composite oxide has a spinel structure.

13. The battery pack of claim 10, wherein the layer comprises a conductive material and a binder.

14. The battery pack of claim 13, wherein the conductive material is a carbonaceous substance.

15. The battery pack of claim 10, wherein the layer further comprises a lithium-titanium composite oxide.

16. The battery pack of claim 10, wherein the layer further comprises titanium dioxide.

* * * * *